US005827962A

United States Patent [19]

Guenther et al.

[11] Patent Number: 5,827,962

[45] Date of Patent: Oct. 27, 1998

[54] HYDRAULIC BRAKE FLUID RESERVOIR LEVEL INDICATOR SYSTEM

[75] Inventors: Stefan Guenther, Lake Orion; Kevin J. Gallagher, Commerce, both of Mich.

[73] Assignee: ITT Automotive Inc., Auburn Hills, Mich.

[21] Appl. No.: 712,714

[22] Filed: Sep. 12, 1996

[51] Int. Cl.[6] .................. G01F 23/30

[52] U.S. Cl. .................. 73/308; 200/84 C

[58] Field of Search .................. 73/305, 306, 307, 73/308; 200/84 C

[56] References Cited

U.S. PATENT DOCUMENTS

| | | | |
|---|---|---|---|
| 3,603,925 | 9/1971 | Hughes et al. | 73/308 X |
| 3,603,926 | 9/1971 | Kimurs | 200/84 C X |
| 3,922,658 | 11/1975 | Harper et al. | 73/DIG. 5 X |
| 3,947,813 | 3/1976 | Uemura et al. | 200/84 C X |
| 4,020,481 | 4/1977 | Nakagawa | 200/84 C X |
| 4,037,193 | 7/1977 | Uemura | 200/84 C X |
| 4,057,700 | 11/1977 | Nakashima | 200/84 C |
| 4,301,440 | 11/1981 | Kubota et al. | 200/84 C X |
| 4,305,285 | 12/1981 | Kubota et al. | 73/308 |
| 4,356,729 | 11/1982 | Kubota et al. | 73/308 |
| 4,609,796 | 9/1986 | Bergsma | 200/84 C |
| 4,833,441 | 5/1989 | Okada et al. | 200/84 C X |
| 4,841,107 | 6/1989 | Tandler et al. | 200/84 C |
| 4,843,193 | 6/1989 | Budecker et al. | 200/84 C |
| 4,866,428 | 9/1989 | Hinkle | 73/307 X |
| 4,926,015 | 5/1990 | Takahashi et al. | 200/84 C |
| 5,031,405 | 7/1991 | Takahashi et al. | 73/308 X |
| 5,156,048 | 10/1992 | DeFigueiredo et al. | 73/DIG. 5 X |
| 5,262,604 | 11/1993 | Powell | 200/84 C |

FOREIGN PATENT DOCUMENTS

| | | |
|---|---|---|
| 7-763 | 2/1980 | European Pat. Off. . |
| 55-209923 | 8/1980 | Japan . |

*Primary Examiner*—George M. Dombroske
*Assistant Examiner*—Paul D. Amrozowicz
*Attorney, Agent, or Firm*—J. Gordon Lewis; Thomas N. Twomey

[57] ABSTRACT

A fluid level indicator for a brake fluid reservoir is disclosed which comprises a socket and circuit board which, once assembled, are installed within a chamber integrally molded with the fluid reservoir. The circuit board is assembled to the socket, which is in turn attached to an instrument panel warning device. In an alternative embodiment, the circuit board is formed integrally with connector pins, and injection molded about to form a socket assembly. The assembly is then attached to the instrument panel and installed within the chamber.

5 Claims, 3 Drawing Sheets

FIG 1
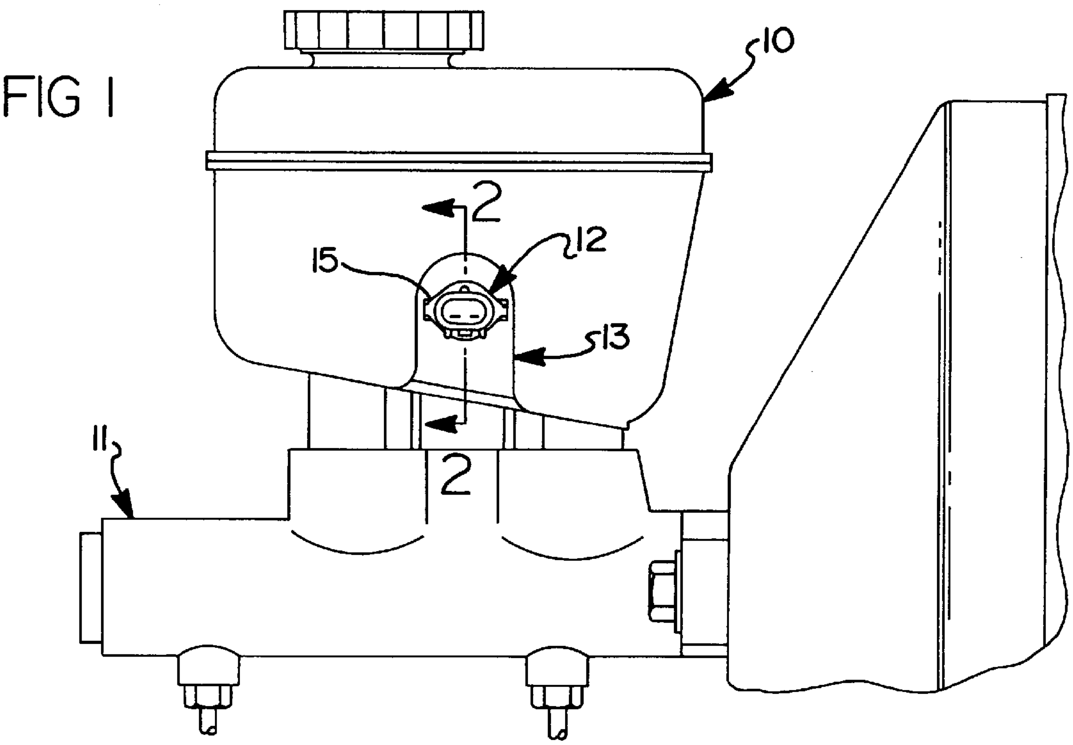
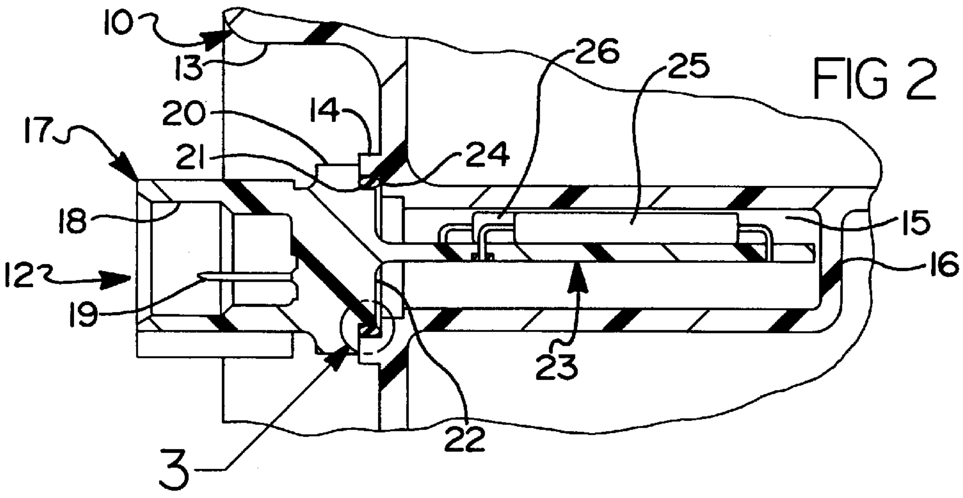
FIG 2
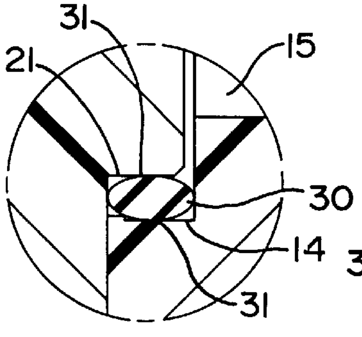
FIG 3a
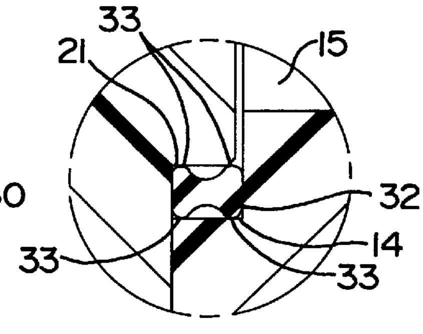
FIG 3b
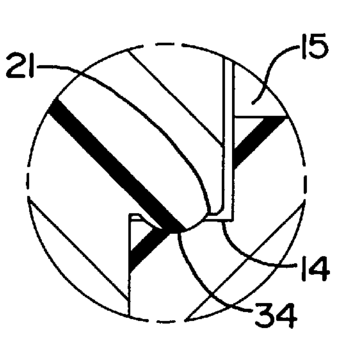
FIG 3c FIG 4
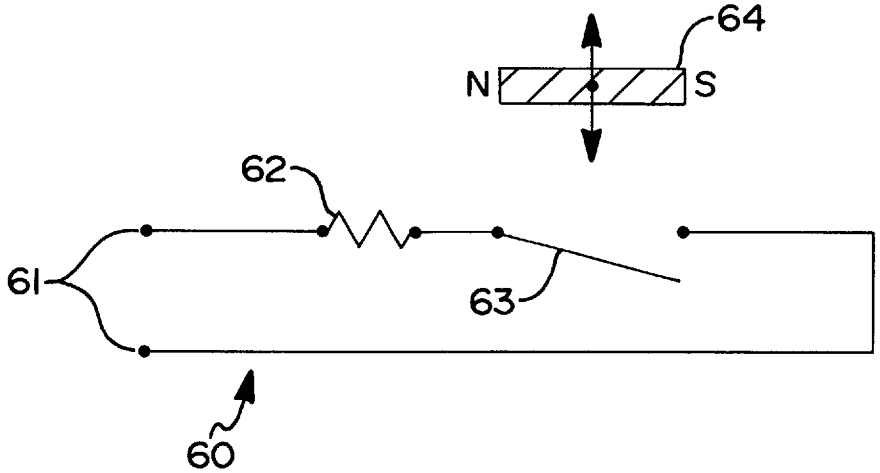
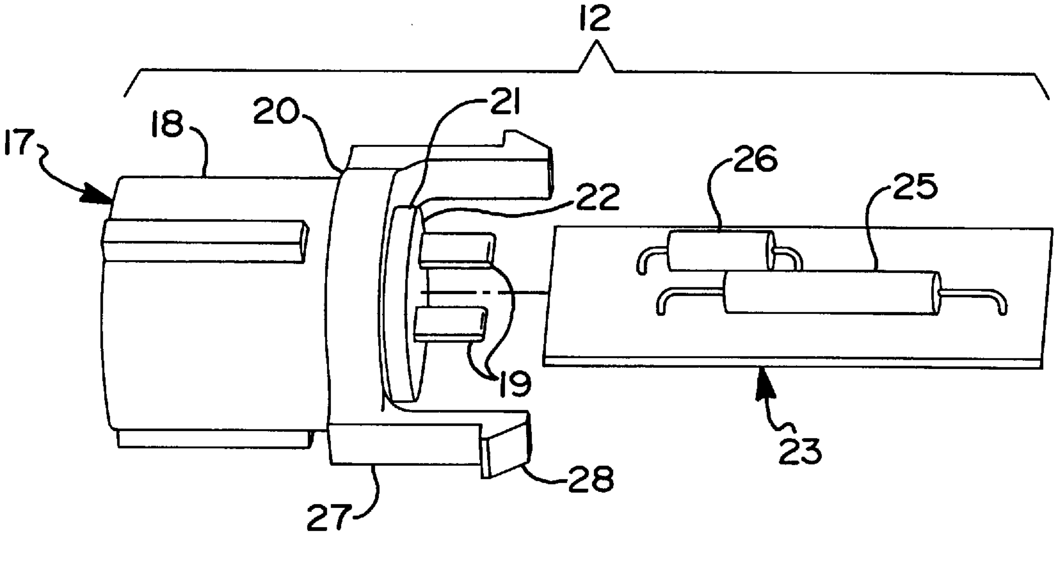
FIG 5

FIG 6a
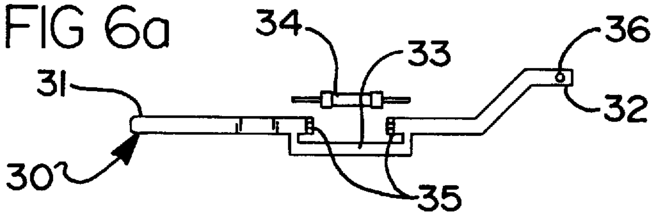
FIG 6b
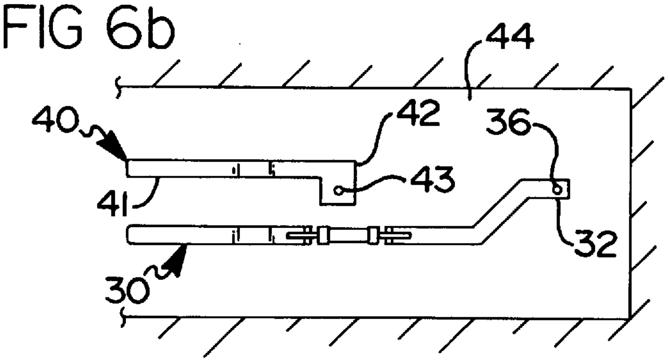
FIG 6c
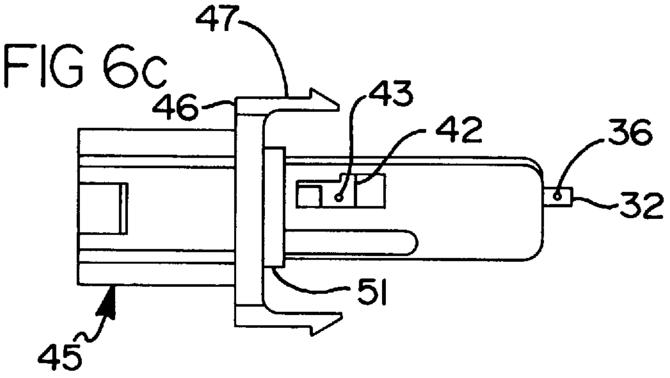
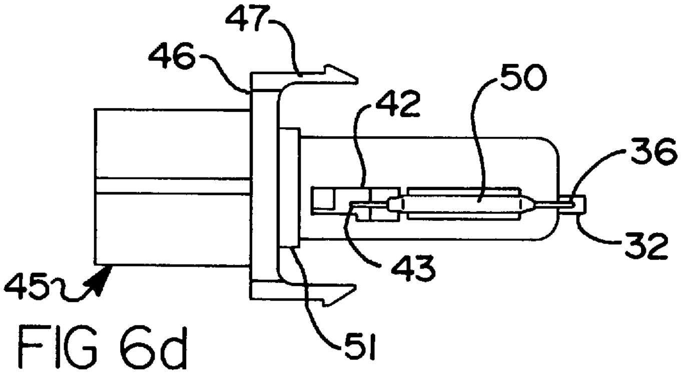
FIG 6d

HYDRAULIC BRAKE FLUID RESERVOIR LEVEL INDICATOR SYSTEM

TECHNICAL FIELD

The present invention relates to a fluid level indicator sensor and more particularly to a brake fluid reservoir fluid level indicator sensor.

BACKGROUND OF THE INVENTION

Many vehicle brake systems incorporate brake fluid level sensors. These systems typically include a fluid level sensor disposed in the fluid reservoir portion of the brake system. The sensing system is typically composed of a magnetic float and a magnetic sensor (such as a reed switch or a Hall effect sensor). When the fluid level within the brake fluid reservoir is reduced to a predetermined level, the magnetic float is brought in close proximity to the magnetic sensor. This causes the magnetic sensor to initiate a signal to warn the vehicle operator (by way of an indicator light on the instrument panel) that the brake fluid level within the brake reservoir is low and service should be pursued.

The environment in which the sensor circuit must operate promotes corrosion of the circuitry, which could lead to failure of the circuit and failure to warn the operator. In particular, the circuitry should be sealed from ambient moisture. In some cases the sensor circuit can be welded directly to the reservoir to prevent corrosion. Still in other cases it is known to first assemble the sensor and then to provide an epoxy coating enclosing the entire switching circuit, thereby preventing environmental conditions from corroding the sensor. However, epoxy coating requires an extra manufacturing step and also requires using additional materials. This extra manufacturing is time consuming as well as an added expense.

Additionally, different vehicle makes and models require differing fluid level sensors. Either the geometry of the brake fluid reservoir or the electrical system differs between models. Thus, each different fluid level sensor may include differing electrical circuitry, or the size of the device may be limited by space constraints, or both. Requiring different fluid level sensors for differing vehicle makes and models adds to the manufacture and assembly expense.

Once manufactured, the sensor may be mounted within a tube integrally molded through the fluid reservoir. The tube is usually formed at or near the bottom of the reservoir, and is open to the ambient environment at both ends. The fluid level sensor is slidingly engaged within the tube to allow the switching device to be acted upon by the float within the reservoir. Accordingly, the fluid sensor itself must be resistant to environmentally induced degradation.

A fluid level sensor assembly is disclosed which is both inexpensive and simple to manufacture and is capable of operating reliably for extended duration within a moist and corrosive environment. In an alternative embodiment, a fluid level sensor assembly is disclosed which includes an interchangeable fluid level sensor capable of utilizing different electrical circuitry with a unitary system of electrical connectors, or capable of utilizing different electrical connectors with unitary electrical circuitry.

SUMMARY OF THE INVENTION

More specifically, a first embodiment of the invention includes a socket and a circuit board which, once assembled, are installed within a chamber integrally molded with the fluid reservoir. The socket contains a set of male pins which allow the socket to be connected to the instrument panel warning device with a female connector. The socket includes an end wall, through which the male pins extend, where the male pins are configured to attach interchangeably to any of several circuit boards. The circuit board includes a switching device, preferably a reed switch, which is activated by proximity to a magnetic float contained within the reservoir. The circuit board is attached to the portion of the pins which extend through the end wall of the socket, forming the sensor. Upon assembly, the sensor is sealingly engaged within the chamber.

In an alternative method, the circuit board is formed integrally with the connector pins. In this method, any necessary electrical components other than the switch are attached to one of a set of male pins. The pins are then placed within an injection molding cavity in a predetermined spatial relationship. The cavity is configured to form a socket about the portion of the pins which are to engage a female connector, and to leave exposed a portion of the pins and the circuitry to allow installation of the switch device.

BRIEF DESCRIPTION OF THE DRAWINGS

The features and inventive aspects of the present invention will become more apparent upon reading the following detailed descriptions, claims, and drawings, of which the following is a brief description.

FIG. 1 is an isometric view showing the invention in use upon an automobile brake system.

FIG. 2 is a fragmentary cross-sectional view of a first embodiment of the present invention taken along arrows 2—2 of FIG. 1.

FIGS. 3*a,* 3*b,* and 3*c* are an enlarged view of the structure within circle 3 of FIG. 2, and depict three alternative sealing surface structures.

FIG. 4 is a circuit diagram of both embodiments of the invention.

FIG. 5 is an exploded isometric view of the first embodiment of the invention.

FIGS. 6*a,* 6*b,* 6*c,* and 6*d* show four progressive assembly steps of the second embodiment of the present invention.

DETAILED DESCRIPTION OF PREFERRED EMBODIMENTS

A brake fluid reservoir 10 is shown in FIG. 1. Reservoir 10 is mounted above master cylinder 11. Recess 13 is integrally molded into reservoir 10. A float sensor insert 12 fits within chamber 15 located within recess 13.

Referring now to FIG. 2, recess 13 of reservoir 10 is shown in detail. Chamber 15 is integrally molded within recess 13, and includes a bottom 16 and collar 14 radially disposed about the opening to chamber 15. Float sensor insert 12 is shown in its installed position, sealingly engaging reservoir 10 within chamber 15. Float sensor insert 12 includes a socket portion 17 and a circuit board portion 23. Socket portion 17 further includes a sleeve 18, which is molded around a set of male pins 19 (only one pin is visible) and is adapted to receive a female connector. Pins 19 are fixed within end wall 22, and extend through end wall 22 to connect to circuit board 23. Shoulder 20 extends radially from sleeve 18, and terminates in a reduced diameter neck 21 adjacent to end wall 22. Upon insertion of float sensor insert 12, shoulder 20 abuts collar 14, while reduced diameter neck 21 is received within collar 14 in sealing engagement 24. Sealing engagement 24 is further described below using FIGS. 3*a,* 3*b,* and 3*c.* Circuit board 23 may be constructed separately from socket 17 and attached thereto prior to insertion into chamber 15. Circuit board 23 preferably includes at least one resistor 26 and a switch 25, preferably a reed switch.

FIGS. 3*a,* 3*b,* and 3*c* show three alternative sealing engagements. In all three, reduced diameter neck 21 is received within collar 14, creating a sealing surface. In FIG. 3*a,* the sealing surface contains an o-ring 30 mounted about reduced diameter neck 21, which is the preferred embodiment. However, o-ring 30 engages the sealing surface at only two points 31. Failure at one of these two points 31 allows external moisture to enter chamber 15. Alternative seals are shown in FIGS. 3*b* and 3*c*. In FIG. 3*b,* a quad-ring seal 32 is shown. Instead of two sealing surfaces, quad-ring 32 forms four sealing surfaces 33, which redundancy creates a more reliable seal. Alternatively, as shown in FIG. 3*c,* collar 14 and reduced diameter neck 21 may be formed with interlocking surfaces 34 which snappingly engage to create a moisture seal. This seal advantageously does not require any additional parts such as an o-ring, and may be formed integrally with the sealing surfaces of collar 14 and reduced diameter neck 21. Thus, a manufacturing step is removed.

A simple diagram of circuit board 23 and its actuation is shown in FIG. 4. Circuit 60 includes end leads 61 with a resistor 62 and a switch 63 in series therebetween. As the fluid residue level of the reservoir drops, the proximity of magnet 64 to switch 63 increases. At a predetermined proximity, the magnetic field of magnet 64 causes switch 63 to close, thereby completing the circuit and actuating the instrument panel warning device.

FIG. 5 shows further detail of float sensor 12. Socket 17 includes sleeve 18, shoulder 20, reduced diameter neck 21 adjacent to end wall 22, through which extends male pins 19 to receive circuit board 23. Shoulder 20 further includes resilient retention arms 27 which terminate in latch projection 28. Resilient retention arms 27 maintain the position of the float sensor insert 12 once mounted within the chamber. Circuit board 23 is shown with a switch 25 and one resistor 26.

A second embodiment of the invention and the method steps of making it are shown progressively in FIGS. 6*a* through 6*d.* In the preferred embodiment, the first pin 30 includes a first end 31, a second end 32, and an intermediate portion 33 therebetween. The electrical component 34 is attached at two predetermined positions 35 on the intermediate portion of the pin, as shown in FIG. 6*a*. Once attached, that part of the intermediate portion between the two points is removed, thus removing an electrical short circuit of the circuitry. Second end 32 includes a solder pad 36 to receive one end of a switch device. The second pin 40, including a first end 41 and a second end 42 which further includes solder pad 43, is placed in a predetermined spaced relationship with the first pin within an injection molding cavity 44, depicted in FIG. 6*b,* and the assembly is encased within non-conductive molding material. Molding plastic is injected and allowed to cool. The plastic forms a socket 45 which includes shoulder 46, retention arms 47 and sealing neck 51. The plastic assembly, as it appears upon removal from the cavity, is shown in FIG. 6*c*. The cavity is configured to leave uncovered the first ends 31, 41 of each pin (not seen in FIGS. 6*c* or 6*d*), and the second ends 32, 42 of each pin such that both solder pads 36, 43 are exposed. However, the cavity is configured to completely encase the circuitry within the molding material.

Lastly, as shown in FIG. 6*d,* a switching device 50, preferably a reed switch, is then attached between the second end 32 of the first pin and the second end 42 of the second pin, thus completing the electrical circuit. In the preferred embodiment, the reed switch 50 is encased within glass which cannot withstand molding pressures. As a result, the switch is attached to the solder pads 32, 42 after molding has occurred. It may also be possible to use a switch compatible with the sensor which can withstand molding pressure. In such a case, the switch would be attached to the solder pads 32, 42 prior to insertion within the molding cavity so that it would be encased within molding plastic. As formed within the molding cavity, the molded socket 45 includes a shoulder 46. Resilient retention arms 47 formed within the cavity extend from shoulder 46 to engage a mount for the assembly. Also formed as part of the socket 45 is a reduced diameter sealing neck 51, which is adapted to receive a sealing surface, preferably an O-ring. Once again, the sealing surface could itself be adapted to sealingly engage the inside surface of the assembly mount, as shown in FIG. 3*c* above. Because the electrical circuitry is fully encased within molding plastic, corrosion of the assembly is prevented except as to the exposed second ends connected to the switch. By sealingly engaging sealing neck 51 inside collar 14 within the chamber 15, corrosion of the exposed second ends is also minimized.

Preferred embodiments of the present invention have been disclosed. A person of ordinary skill in the art would realize, however, that certain modifications would come within the teachings of this invention. Therefore, the following claims should be studied to determine the true scope and content of the invention.

We claim:

1. A fluid level indicating system, comprising:

A reservoir including a chamber, said chamber including a collar radially disposed about the entrance to said chamber;

a first electrically conductive pin having a first end and a second end, said first pin end adapted to receive a female pin, said first pin including electrical components attached in series between said first end and said second end, said second end including a first solder pad;

a second electrically conductive pin having a first end and a second end, said first end adapted to receive a female pin, said second end including a second solder pad;

said first and second pins and said electrical components encased within non-conductive injection molding material whereby said first and said second said solder pads are left exposed, and whereby said first ends of said first and second pins are surrounded by said molding material to form a socket, said socket including a shoulder terminating in a reduced diameter neck, said neck including a sealing surface thereon;

and an exposed switch attached between said first and second solder pads.

2. A fluid level indicating system as in claim 1, wherein said sealing surface includes an o-ring seal.

3. A fluid level indicating system as in claim 1, wherein said sealing surface includes a quad-ring seal.

4. A fluid level indicating system as in claim 1, wherein said shoulder includes a resilient retention arm, said arm including a latch means.

5. A fluid level indicating system as in claim 1, wherein said switch is a reed switch.

* * * * *